May 23, 1961 C. R. LOCKLIN 2,985,290

ONE-PIECE SPRING CLIP FOR RECORDING TAPE REELS

Filed Aug. 4, 1958

INVENTOR.
CHARLES R. LOCKLIN.
BY
Barthel & Bugbee
ATTY'S.

United States Patent Office 2,985,290
Patented May 23, 1961

2,985,290

ONE-PIECE SPRING CLIP FOR RECORDING TAPE REELS

Charles R. Locklin, 2140 Lochaven Road, Pontiac, Mich.

Filed Aug. 4, 1958, Ser. No. 752,942

1 Claim. (Cl. 206—53)

This invention relates to spring clips and, in particular, to recording tape holding clips.

One object of this invention is to provide a spring clip for firmly holding the outer end of a recording tape upon its reel against the rolled-up portion of the tape beneath it as an abutment, so as to prevent the tape from unwinding during storage, handling or shipment.

Another object is to provide a spring clip of approximately M-shaped form having a central approximately U-shaped anvil portion which substantially spans the space between the reel side discs and extends downwardly into this space into holding engagement with the end of the recording tape and also having side legs which urge the side discs into engagement with the opposite sides of the anvil portion.

Another object is to provide a spring clip as set forth in the object immediately preceding, wherein the opposite outer side legs converge toward one another at their free ends while the inner side arms of the anvil portion are disposed substantially parallel to one another, thereby causing the outer legs and inner side arms on each side of the clip to closely approach one another adjacent the central or bridge part of the anvil portion.

Other objects and advantages of the invention will become apparent during the course of the following description of the accompanying drawings, wherein.

Figures 1, 2, 3, 4, 5:
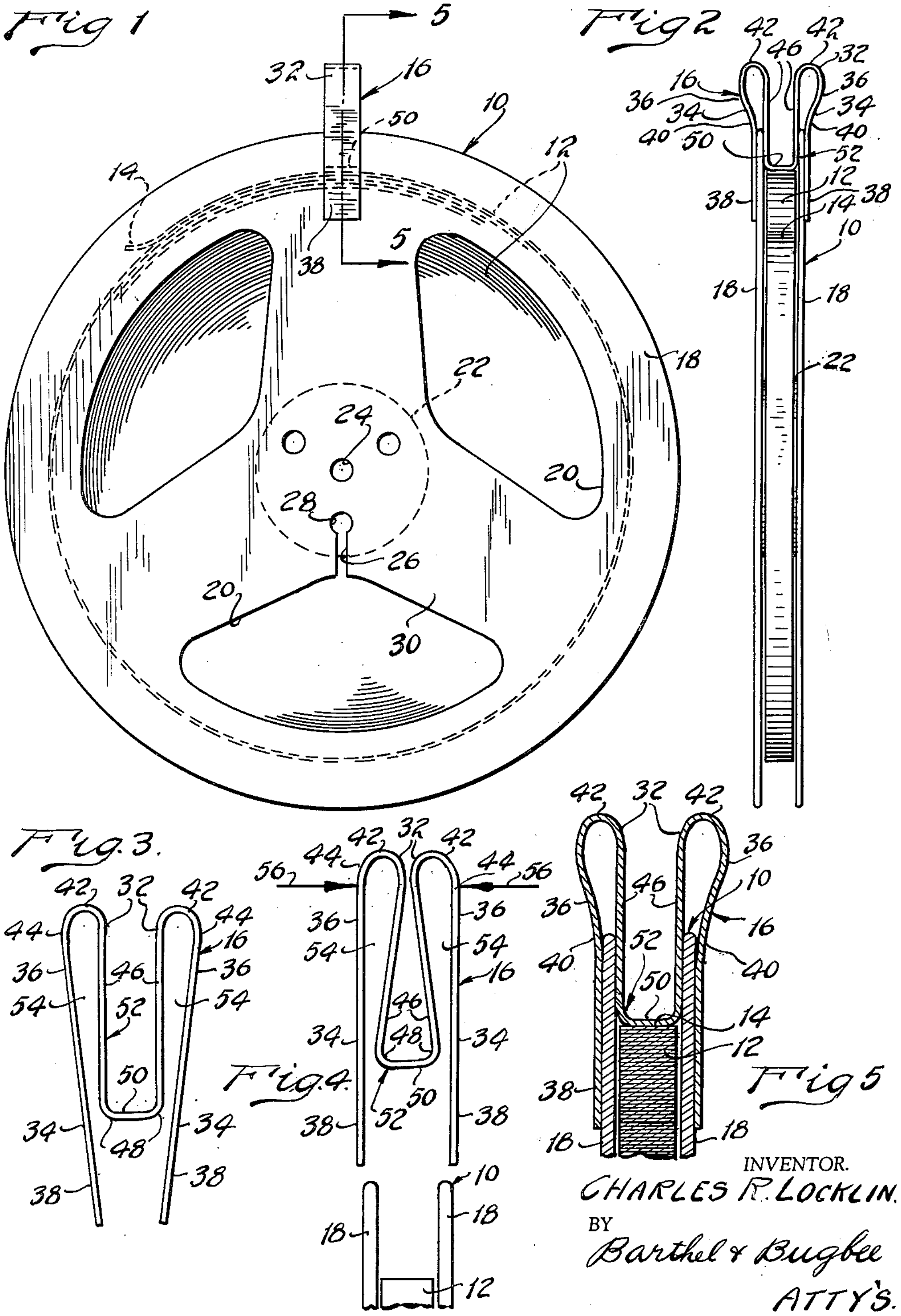
Figure 1 is a side elevation of a recording tape reel with recording tape wound thereon and a spring clip attached thereto, according to one form of the invention, in clamping relationship with the free end of the tape.
Figure 2 is a front elevation of the reel and clip shown in Figure 1.
Figure 3 is an enlarged front elevation of the spring clip shown in Figures 1 and 2 in its relaxed condition when removed from the reel.

Figure 4 is a view similar to Figure 3, but with the outer legs of the spring clip spread apart by pressure at the points indicated by the arrows, immediately prior to applying it to the tape reel shown immediately beneath it; and Figure 5 is an enlarged fragmentary vertical section taken along the line 5—5 in Figure 1, showing in detail the points of application of the various parts of the spring clip to the reel side discs and tape wound on the reel.

Referring to the drawings in detail, Figure 1 shows a recording tape reel, generally designated 10, with a recording tape 12 wound thereon, the outer end portion 14 of which is held in place by a spring clip, generally designated 16, according to one form of the invention. The reel 10 and tape 12 are conventional and are beyond the scope of the present invention. Such reels 10 come in various forms and sizes and the tapes 12 are of various kinds, being frequently constructed of magnetic material such as steel. For background purposes of the present invention, the reel 10 is shown as having parallel disc-shaped sides 18 with cutouts 20 to reduce the weight thereof and provide access to the side edges of the convolutions of the tape 12 which is connected at its inner end to a cylindrical hub 22 having a central axle hole 24. One of the cutout portions 20 has a slot 26 extending radially inward to a hole 28 for driving purposes. The cutouts 20 result in the formation of radial spokes 30.

The clip 16 consists generally of an approximately M-shaped resilient member 32. The resilient member 32 is preferably of non-ferrous metal, such as spring brass, aluminum alloy or resilient plastic, so that it will not become accidentally magnetized and consequently cause deterioration of the tape 12 when the latter is magnetic recording tape. The member 32 has outer legs 34 with upper portions 36 adapted when in use (Figures 2 and 5) to be bent slightly at obtuse angles relatively to the lower portions 38 at bending points 40, as more fully described below in connection with the use of the invention.

The upper portions 36 of the outer legs 34 are provided with reverse bends 42 meeting the outer legs 34 at junctions 44 and connecting the outer legs 34 to a pair of inner arms 46 which in turn are interconnected at their lower ends 48 by a bridge portion 50 so as to form an approximately U-shaped anvil portion 52. The bridge portion 50 is located at a level above the lower portions 38 of the outer legs 34. This construction provides elongated gaps 54 between the outer and inner arms 34 and 46 to accommodate the peripheries of the discs 18 of the tape reel 10 when the clip is in its tape-holding position (Figures 2 and 5).

In the use of the invention, the clip 16 in its detached and relaxed position is shown in Figure 3, the outer legs 34 converging toward one another at acute angles to the inner arms 46. To attach the clip 16 to the reel 10 so as to hold the end 14 of the tape 12 firmly in position without danger of unreeling, the user grasps the junctions 44 of the bent portions 42 of the M-shaped member 32 between his thumb and forefinger, squeezing them together in the direction of the arrows 56 (Figure 4) so as to spread the outer legs 34 apart at their lower ends and pull the inner arms 46 and the outer leg portions 34 approximately into parallelism (Figure 4). This action thereby spreads apart the lower outer leg portions 38 a distance wider than the width of the reel 10 so that they may be slid downward over the outsides of the discs 18 of the reel 10 and brought into engagement with the discs 18. The clip 16 is pushed downward until the bridge portion 50 of the anvil portion 52 firmly engages the end portion 14 of the tape 12, whereupon the clip is released by spreading the thumb and forefinger apart. This action, from the resilient nature of the M-shaped member 32, causes the outer legs 34 to spring inward to cause the lower portions 38 to flex parallel to one another so as to apply inward pressure against the pads 36 and discs 18, forcing the discs 18 into engagement with the inner arms 46 of the anvil portion 52 near their lower ends 48, at the same time holding the bridge portion 50 firmly down against the tape end portion 14.

With the clip 16 thus attached, the tape end 14 cannot unwind and form the annoying and time-consuming snarls which have previously been common in recording studios and other places making use of recording tape. Furthermore, by the use of the clip of the present invention, it is no longer necessary to apply an adhesive sticker to secure the tape end portion 14 to the adjoining part of the tape 12 in order to prevent it from unreeling, and accidents to the tape recorder can no longer occur from the inadvertent retention of a portion of the adhesive sticker to the recording tape 12. Directions accompanying reels of recording tape instruct the user to remove such stickers, but portions thereof occasionally adhere to the tape, notwithstanding the removal of the remainder thereof, and cause damage to the recorder or interference with the quality of the sound being recorded on the tape or being played or otherwise reproduced from an already recorded tape.

What I claim is:

A one-piece spring clip adapted to simultaneously frictionally grip the side disc peripheries of a tape reel and the outer end of a recording tape wound thereon, said spring clip comprising an approximately M-shaped member of resilient sheet material including a central substantially-flat horizontal bridge portion having a length adapted to span substantially the entire width of the tape end and space between the reel side discs, a pair of elongated substantially parallel arms integral with and extending upwardly from the opposite ends of said bridge portion and having substantially equal lengths which are a plurality of times the length of said bridge portion, a pair of reversely-bent loops having their inner ends integral respectively with the upper ends of said arms and extending laterally outward therefrom, and a pair of elongated substantially straight legs integral respectively with the outer ends of said loops and of greater lengths than said arms extending downwardly from said loops past said bridge portion in converging relationship to said arms and to one another with the lower ends of said legs disposed closer to one another than the upper ends thereof at their junctions with said loops, whereby upon installation of the clip upon the reel the legs and arms spring into substantially parallel frictionally-gripping relationship with the outer and inner surfaces respectively of both reel side discs while the bridge portion frictionally grips and holds down the tape end over substantially its entire width between the reel side discs throughout a widely varying range of diameters of wound-up tape.

References Cited in the file of this patent

UNITED STATES PATENTS

| | | |
|---|---|---|
| 1,156,396 | Denio | Oct. 12, 1915 |
| 2,140,729 | Atwood | Dec. 20, 1938 |
| 2,256,107 | Zadek | Sept. 16, 1941 |
| 2,273,701 | Funke | Feb. 17, 1942 |
| 2,519,987 | Wernette | Aug. 22, 1950 |
| 2,539,581 | Holden | Jan. 30, 1951 |
| 2,822,919 | Kulka | Feb. 11, 1958 |

OTHER REFERENCES

Knobloch, B.: 30,320, IXa/429, Sept. 1, 1955.